Patented Aug. 26, 1941

2,253,595

UNITED STATES PATENT OFFICE 2,253,595

TITANIUM OXIDE PRODUCTION

Howard J. Wood, Baltimore, Md., assignor to E. I. du Pont de Nemours & Company, Wilmington, Del., a corporation of Delaware No Drawing. Application November 26, 1938, Serial No. 242,603

8 Claims. (Cl. 23—202)

This invention relates to the production of titanium oxide and more particularly to the production of titanium oxide by hydrolyzing titanium salt solutions. More specifically, it relates to improvements in hydrolysis of titanium salt solutions, whereby a product of improved properties inherently results. Still more particularly, it relates to the production of precipitated titanium dioxide of improved filterability and pigmentary characteristics.

As is known, hydrated titanium oxide may be obtained by the hydrolysis of mineral acid solutions of titanium salts. These solutions are prepared by dissolving titanium-bearing ores, such as ilmenite or rutile, with sulfuric acid, hydrochloric acid, etc. Numerous and varied processes for the purpose are known, of which the most widely used comprises reacting ilmenite with sulfuric acid to produce a relatively dry mass adapted to be subjected to dissolution in water, dilute titanium liquors, or dilute sulfuric acid solutions, whereby a concentrated titanium sulfate solution is produced. This solution is cooled to remove a portion of the ferrous sulfate, and is then prepared for hydrolysis by suitable concentration adjustment. Hydrolysis is initiated by procedures such as disclosed in U. S. Reissue Patents 18,854 or 18,790, the hydrolysis product obtained being separated from its mother liquor by filtration and washing, after which it is calcined and finished in accordance with well-known procedures to develop proper pigment properties.

The washing operation which is required in titanium oxide production constitutes a very important step in the purification of the precipitated titanium dioxide. As may be readily understood, it is not possible, economically or chemically, to remove all soluble impurities present in titanium liquors obtained from acid attack of titanium ores. To insure production of a relatively pure, white product, these impurities, together with acid released by the subsequent hydrolysis of such liquors must be removed from the hydrolysis precipitate. The filtration and washing operations employed for effecting such purification are therefore of prime importance, as is production of a hydrolysis precipitate which is readily amenable to filtration and washing and without any undue loss in yield.

White titanium oxide pigments are employed in a wide field of commercial applications. Aside from the necessity of exhibiting a required neutral tint, such pigments must also meet other specifications, such as desired uniformity and smallness of particle size. To meet these and other requirements, control over the particle size which a titanium pigment will ultimately exhibit is obviously very necessary and desirable in titanium oxide-producing operations.

In the production of titanium oxide pigments and to effect hydrolysis of titanium salt solutions from which such pigments are obtained, it is necessary that such solutions be first nucleated or seeded. The nuclei utilized for the purpose may be variously supplied to the hydrolysis solution, the disclosure of U. S. Reissue Patent 18,854 setting forth very desirable and effective methods for effecting such results. Thus, in accordance with such a process, a titanium liquor may be added at a relatively slow rate to a tank of water or dilute acid, the resultant mixture being agitated during such addition and maintained at an elevated temperature. As a result, the liquor becomes charged with small nuclei which grow in size during the hydrolysis, the latter being effected by boiling the solution for several hours. During hydrolysis the liquid changes from a relatively dark, colored solution, which upon moderate dilution yields a transparent liquor, to an opaque suspension containing substantial concentrations of precipitated titanium oxide, e. g., passing from a colloidal state at the end of addition to a precipitated suspension of titanium oxide hydrolysate in dilute sulfuric acid upon hydrolysis completion.

Heretofore, it has been considered essential that, to promote the best nucleating conditions during liquor addition, maintain relatively uniform temperature conditions throughout the liquor undergoing hydrolysis, as well as prevent undesired settling, vigorous and continuous agitation to promote turbulence of such liquor and throughout hydrolysis must be had. This agitation is variously effected in the art, usually by resorting to conventional types of agitating media, such as paddle, blade or sweep type of agitators or mixers, or by use and injection of air, steam or other fluids into the liquor or by a combination of these modes.

It has been discovered that the filtration rate exhibited by the hydrolysis precipitate, as well as the ultimate pigment properties such as color, tinting strength, particle size uniformity, etc., which may be developed therein, become largely influenced by and vary greatly with the conditions of agitation and extent or degree of turbulence which exists in the hydrolysis liquor during titanium oxide precipitation. It has also been found that the hydrolysate precipitate is most susceptibly sensitive to such conditions of turbulence during that portion of the hydrolysis period when transition of the solution from a true colloid to a suspension of filterable particles in the hydrolysis liquor is being effected. It has been further found that during this latter period it is especially desirable and advantageous that the extent of turbulence or conditions of agitation to which the hydrolysis liquor is subjected should be carefully controlled, and that if a relatively quiescent state or condition of liquor is maintained during such period, the production of a readily and easily filterable precipitate and ultimately satisfactory pigment product will be assured.

It is among the objects of my invention, therefore, to provide an improved process for effecting the hydrolysis of titanium liquors in the production of titanium oxide; to provide a hydrolysis process which readily yields an improved, readily filterable hydrolysate product which inherently possesses a higher filtration rate than products obtainable from prior hydrolysis processes; and as a consequence one which is readily amenable to the washing and filtration operations now in use in effecting hydrolysate purification. A further object includes the provision of an improved process adapted to inherently produce a hydrolysate product which is relatively uniform in character and which, upon subsequent treatment to develop its pigment properties, will exhibit the improved pigmentary characteristics which have been alluded to, and especially in respect to tinting strength, color and uniformity of particle size.

These and other objects are obtainable in my invention which broadly comprises effecting the hydrolysis of titanium salt solutions under conditions of carefully controlled agitation or liquor turbulence. More specifically, it comprises so controlling the conditions of liquor agitation prevailing during hydrolysis, and particularly during that period when transition from a crude colloidal solution to a definite, filterable hydrolysate suspension is being had, that a substantially quiescent liquor condition exists, as distinguished from a relatively turbulent or non-quiescent state.

In adapting the invention, a titanium solution such as titanium sulfate is nucleated in accordance with procedures such as described in said U. S. Reissue Patent 18,854, the titanium solution being added relatively slowly to a tank of water, the resultant mixture being maintained preferably at an elevated temperature. To effect suitable agitation or turbulence of the liquor to be hydrolyzed, the receiving tank may be provided with suitable liquor agitating means, such as a conventional and well-known sweep type of agitator, or with suitable means for injecting an agitating fluid such as air or steam, or with both said mechanical agitator or fluid injecting means. In instances where the conventional sweep type of agitator is utilized, one or a plurality of rigidly disposed arms, blade or paddle members, are provided on the agitator, and such means extends throughout the substantial length or height of the tank. Said blade or paddle members are operatively disposed within said tank and in spaced relationship from its internal walls, said blades being fixedly secured to and spaced in perpendicular relationship from a vertical, suitably powered drive shaft. The latter extends from above, into and throughout the substantial central portion of said tank. Normally, and in order to provide desired violent agitation and turbulence during liquor nucleation and hydrolysis, said agitator arms are rotated at relatively constant peripheral speeds ranging from about 7.25 to about 15 feet per second. Where fluid injection is resorted to for effecting such turbulence of liquor within the receiving tank, relatively constant fluid rates ranging from about 200 cu. ft./min. to 400 cu. ft./min. or higher are usually employed during nucleation and hydrolysis.

In accordance with my invention, and to overcome the deleterious effects which violent and continued agitation of the hydrolysis liquor exerts upon hydrolysate filterability and the pigment properties which said product ultimately exhibits upon development, I control and regulate the extent of such liquor turbulence or degree of agitation by suitably diminishing the extent thereof or maintain, preferably, a relatively quiescent liquor condition altogether, particularly during certain portions and stages of the hydrolysis. Thus, during nucleation of the titanium solution and promotion of desired homogeneity in the hydrolysis liquor, and particularly during the period of hydrolysis when coagulation or flocculation of precipitate is taking place, I observe and maintain certain critical agitator peripheral speeds (if employing this means for inducing liquid turbulence), or air, steam or other fluid rates (if such means is employed), or completely interrupt agitator movement or fluid introduction if such media are employed for effecting such agitation. For example, in lieu of the previously utilized high rates of agitator peripheral speeds effected upon nucleation of the hydrolysis liquor or during its coagulation, I resort to agitator peripheral speeds not in excess of about 4 feet per second and preferably less than about 2 feet per second, or completely stop or interrupt movement of the agitator altogether. If utilizing fluid injection as a means for inducing liquor turbulence, in lieu of utilizing fluid rates in excess of 200 cu. ft./min., I resort to fluid rates below substantially 100 cu. ft./min., and preferably not in excess of 50 cu. ft./min., or interrupt fluid injection entirely. As a result of such controlled conditions of liquor agitation or the maintenance of a relatively quiescent liquor state during certain stages of the hydrolysis, and particularly that period when flocculation of the titanium oxide precipitate is occurring, I find that the properties of the resultant hydrolysate product, and particularly its filtration rate and ultimate pigment characteristics, become considerably enhanced and improved.

In a more specific and preferred embodiment of the invention, hydrolysis is initiated by adding a relatively concentrated titanium solution to water in a receiving tank maintained at an elevated temperature, whereby a relatively large number of nuclei are produced in the solution. During addition, the mixture is well agitated in said tank, agitation being effected throughout addition and continuing until flocculation or coagulation of the hydrolyzing particles takes place. Thereupon movement of the agitator (if this means for inducing turbulence is employed) or injection of air or steam (if this type of agitating medium is resorted to) is completely interrupted and the solution is allowed to stand undisturbed and in quiescent condition until it presents a relatively cream colored appearance, to indicate the presence of white, hydrolyzing titanium oxide flocculated into particles of desired, filterable dimensions. When this condition is obtained, the means employed for effecting liquor agitation is again set in motion and at the normal speed initially employed during nucleation. Such agitation is continued and at a relatively constant rate until hydrolysis becomes substantially complete. The hydrolysate precipitate obtained is then washed and dried, being subsequently subjected to calcination at temperatures ranging from above 800° C. to about 1100° C., and preferably within the range of 950° C. to 1050° C. to develop its pigment properties.

The beneficial effects which arise by reason of effecting hydrolysis in accordance with my controlled conditions of liquor agitation or turbulence are especially notable in connection with the filtration rate which the hydrolysis precipitate exhibits. Thus, when suspensions of equal $TiO_2$ concentration are comparably tested on a well-known type of vacuum leaf filter, one suspension comprising the hydrolysate product obtained in accordance with prior methods of violent agitation throughout nucleation and hydrolysis, and the other such as obtained in accordance with my invention, my hydrolysate will be found to possess a filtration rate at least 1½ times as great as that of the hydrolysate from prior procedures. One is thus enabled by my invention to obtain at least 50% more capacity from filter installations. Additionally, the pigment which is ultimately obtained from my hydrolysate product will possess improved pigmentary characteristics over prior products, particularly in respect to tinting strength, color and particle size uniformity, thus affording further and desirable advantages over prior titanium oxide pigments.

In order that the invention may be more clearly understood, the following illustrative examples are given, none, however, to be considered as in limitation of my invention:

Example I

A titanium solution to be employed for hydrolysis was prepared by treating a titanium-bearing ore (ilmenite) with sulfuric acid. The reaction product was dissolved in water, its iron content converted to the ferrous state, the major portion of such iron being subsequently removed from the solution by crystallization. The solution was then concentrated and on analysis was found to consist of the following composition:

|  | G/l. |
|---|---|
| $TiO_2$ | 200 |
| Fe (ferrous) | 25 |
| $H_2SO_4$ | 600 |

2000 gallons of this solution, heated to about 100° C., were slowly added to a receiving tank provided with a sweep type of agitator and containing 1000 gallons of boiling water. During mixing, a peripheral speed of agitator of approximately 10 feet per second was maintained, such rate of speed being continued for a short time after conclusion of mixing and to insure desired homogeneity of the solution. Thereupon the peripheral speed of the agitator was decreased to approximately 3.2 feet per second and maintained at such rate until the solution had changed, by flocculation, from a state where no precipitation was observable to a substantially filterable suspension of hydrolysate product in sulfuric acid. Upon conclusion of coagulation, the peripheral speed of the agitator was increased to its initial 10 feet per second rate and constantly maintained at such rate for the remainder of the hydrolysis. At conclusion of hydrolysis, it was found, on analysis, that a yield of 95% $TiO_2$ was obtained.

Example II

For direct comparison, the hydrolysis procedure set out in the foregoing example was duplicated in every respect, save that the rate of peripheral speed of the agitator was maintained constant and at 10 ft. per second throughout nucleation, coagulation and hydrolysis, as in usual, normal and conventional practice. The hydrolysate product from this operation was then comparably tested with the product resulting from Example I and their relative filtration rates determined. The method of test employed comprises a commonly utilized vacuum method of test which is more particularly set out and described in Perry's Chemical Engineers' Handbook (1934) commencing at page 1384. The separate products were then identically washed, calcined, wet ground and dried. Their relative pigment properties, particularly in respect to color and tinting strength, were then determined likewise on a comparable basis, and in accordance with the methods employed by J. E. Booge and H. E. Eastlack in the Paint, Oil and Chemical Review, under dates of April 9, 1924, and April 16, 1924. In accordance with such methods, tinting strength and color data are recorded on arbitrary scales and in which a difference of one point in the scale is material.

The results of these tests are given below, Pigment A being a product produced in accordance with my invention and obviously superior in view of the larger values it exhibits; whereas, pigment B comprises the product obtained in accordance with prior and conventional procedures:

| Pigment | Filtration rate | Tinting strength | Color |
|---|---|---|---|
| A | (A = 1.5 times B) | 150 | 20 |
| B |  | 147 | 18 |

Example III

The hydrolysis of this example was conducted similarly to that of Example I, employing the same type of tank and agitation equipment. Three volumes of titanium solution having the same composition as that set forth in Example I were heated to 100° C. and slowly added to 1 volume of boiling water. During addition a precipitate first forms, but shortly thereafter and on further addition of titanium solution becomes dispersed so that at the end of the introduction period the solution appears to be in a relatively clear condition. A few minutes after introduction, a slight turbidity appears which becomes more and more marked as the color of the colloidal solution passes successively from black to olive green to a steel gray. Upon noting that color change becomes more rapid, agitation of liquor was stopped entirely and for a period of about 10 minutes, during which time the color of the mixture rapidly changed to a tan and finally to a cream color. During this time the solution changed from true colloidal suspension from which no solids can be filtered, to a suspension of flocculated titanium oxide or hydrated particles adapted to settle or be filtered. Upon the solution's attaining the aforesaid cream color, the agitator was again started, its peripheral speed maintained at the initially utilized, relatively constant rate and the solution boiled for a period of about 3 hours to effect completion of hydrolysis, the yield of TiO₂ obtained found on analysis to be in excess of 95%. When the rate of filtration of the precipitate was measured under standard conditions, it was found to be 52% greater than that for a product from a process in which agitation was continuously employed throughout the flocculation period.

In adaptations of the invention where agitation is dispensed with entirely, settling of the pigment suspension may occur during the quiescent period thus afforded, but this is not a serious difficulty since upon resumption of stirring, it again becomes suspended. This resumption of agitation is important for that reason and since the second period of agitation has a duration of not less than about 2 hours, a completely homogeneous solution is obtained and no solid residues are left in the tank when emptied.

As outlined in the foregoing examples, the invention is particularly useful in hydrolyses where the nuclei are produced by adding titanium sulfate liquor to water, but its usefulness is not limited thereto. It has equal applicability to the hydrolysis of titanium salt solutions generally and which have been nucleated by other means, regardless of whether the nuclei comprise a titanium oxygen compound or a foreign material, such as an extender or calcium sulfate, as proposed in U. S. Patents 1,906,729 or 1,906,730.

As will be evident, the degree of turbulence to which the hydrolysis liquor may be subjected within a given tank is widely variable and will depend largely upon the amount of liquor present therein, the size or diameter of said tank and the type of agitator or stirring medium utilized for effecting agitation, as well as its peripheral speed, if a mechanical device, or its rate of injection into the liquor, if fluid media are utilized for such purpose. As indicated, in effecting the relatively quiescent condition of hydrolysis liquor in accordance with my invention and particularly during the hydrolysis coagulation period, I resort to agitator peripheral speeds, if employing a mechanical device, of not to exceed about 4 feet per second, and preferably below about 2 feet per second, down to complete stoppage or interruption of movement of the agitator. Similarly, if an injecting fluid such as steam, air or other gaseous medium, or combination of the same, is utilized, I prefer to so regulate or control its rate of introduction into the tank so that not in excess of 100 cu. ft./min. and preferably below 50 cu. ft./min. become injected, or interrupt its introduction into the tank entirely during the stages of hydrolysis referred to. In instances where both types of agitating or liquor turbulence-inducing media are utilized, they may be readily correlated so as to provide for and induce the desired relatively quiescent condition of liquor.

In instances where fluid media are injected into the hydrolysis tank to promote turbulence or agitation of the hydrolysis liquor, it will be found desirable to increase the trivalent titanium concentration liquor to substantially in excess of about 5 g./l. in order to compensate for any oxidation which may occur by reason of air or other fluid injection, and thus prevent the presence of undesired quantities of ferric iron during hydrolysis.

While the invention has been particularly described in connection with its preferred application to titanium sulfate solutions, nucleated by slow addition to a hot diluent, obviously it is also usefully employable in the hydrolysis of solutions seeded or nucleated by resort to separately added seed materials, as well as in the hydrolysis of other titanium salt solutions, such as titanium chloride, nitrate, bromide or fluoride. Also, the beneficial effects of the invention are obtainable in the preparation of extended titanium oxide pigments by processes wherein a titanium salt solution, such as the sulfate, is hydrolyzed in the presence of well-known extenders, such as barium or calcium sulfate, etc.

I claim as my invention:

1. In a process for hydrolyzing a titanium salt solution at an elevated temperature to obtain a titanium oxide raw pigment precipitate therefrom, the improvement which comprises during nucleation of said solution maintaining the same in substantially turbulent condition by mechanically agitating the same, subsequently and during the period in which said solution changes from a substantially turbid condition to a substantially cream-colored appearance, reducing the turbulent condition thereof by reducing the extent of mechanical agitation which is applied thereto, thereafter and during substantially the remainder of the hydrolysis operation maintaining said solution in turbulent condition by again subjecting the same to strong mechanical agitation.

2. In a process for hydrolyzing a titanium salt solution at an elevated temperature to obtain a titanium oxide raw pigment precipitate therefrom, the improvement which comprises during nucleation of said solution maintaining the same in substantially turbulent condition by mechanically agitating the same, subsequently and during the period in which said solution changes from a substantially turbid condition to a substantially cream-colored appearance, maintaining the same in substantially quiescent state by interrupting the mechanical agitation being applied thereto, thereafter and during substantially the remainder of the hydrolysis operation again maintaining said solution in substantially turbulent condition by again applying mechanical agitation thereto.

3. In a process for hydrolyzing a titanium sulfate solution at an elevated temperature to obtain an improved form of titanium oxide raw pigment precipitate, the improvement which comprises during nucleation of said solution maintaining the same in substantially turbulent condition by means of strongly applied mechanical agitation, following nucleation and during the period in which said solution changes in color successively from black to olive green to a steel gray, reducing its turbulence by reducing the extent of mechanical agitation which is applied thereto, thereafter and during substantially the remainder of the hydrolysis operation again maintaining said solution in substantially turbulent condition by again applying strong mechanical agitation thereto.

4. In a process for hydrolyzing a titanium sulfate solution at an elevated temperature to obtain an improved form of titanium oxide raw pigment precipitate, the improvement comprising during nucleation maintaining said solution in substantially surbulent condition by mechanically strongly agitating the same, following nucleation and during the period in which the solution changes in color successively from black to olive green to a steel gray, maintaining the same solution in substantially quiescent condition by completely interrupting said mechanical agitation, thereafter and upon change of the solution to a substantially cream-colored appearance, again maintaining the solution in substantially turbulent condition by again subjecting it to strong mechanical agitation, and continuing said agitation until hydrolysis is substantially completed.

5. In a process for hydrolyzing a titanium sulfate solution at an elevated temperature to obtain an improved titanium oxide raw pigment precipitate therefrom, the improvement which comprises during nucleation of said solution maintaining the same in substantially turbulent condition by strongly agitating the same with a stirring element operating at peripheral speeds ranging from about 7.25 to about 15 feet per second, thereafter and during the period in which said solution changes from substantially turbid character to a substantially cream-colored appearance reducing the turbulence of said solution by decreasing the peripheral speed of said element to not to exceed substantially 4 feet per second, thereafter and during substantially the remainder of the hydrolysis again maintaining said solution in substantially turbulent condition by maintaining a peripheral speed of stirring element at a range of from substantially 7.25 to about 15 feet per second.

6. A process for hydrolyzing a titanium sulfate solution to obtain an improved titanium oxide raw pigment precipitate therefrom, which comprises during nucleation of said solution maintaining the same in substantially turbulent condition through mechanical agitation by means of a stirring element operating at peripheral speeds ranging from about 7.25 to about 10 feet per second, thereafter and during the period in which said solution changes from one of substantially turbid character to a substantially cream-colored appearance, reducing the turbulence of said solution by decreasing the peripheral speed of said element to not to exceed substantially 2 feet per second, thereafter and during substantially the remainder of the hydrolysis maintaining said solution in substantially turbulent condition by again operating said element at a peripheral speed ranging from substantially 7.25 to about 10 feet per second.

7. A process for hydrolyzing a titanium sulfate solution to obtain an improved titanium oxide raw pigment precipitate therefrom, which comprises during nucleation of said solution maintaining the same in substantially turbulent condition through mechanical agitation by means of a stirring element operating at peripheral speeds ranging from about 7.25 to about 15 feet per second, thereafter and during the period in which said solution changes from one of substantially turbid character to a substantially cream-colored appearance maintaining said solution in substantially non-turbulent condition by completely interrupting movement of said stirring element, thereafter and during substantially the remainder of the hydrolysis maintaining said solution in substantially turbulent condition by again operating said element at a peripheral speed ranging from substantially 7.25 to about 15 feet per second.

8. A process for hydrolyzing a titanium salt solution to obtain an improved titanium oxide raw pigment precipitate therefrom, comprising during nucleation of said solution maintaining the same in substantially turbulent condition by injecting air therein at a fluid rate of flow ranging from about 200 cubic feet per minute to 400 cubic feet per minute, thereafter and during the period in which said solution changes from a substantially turbid character to substantially cream-colored appearance, reducing the turbulence of said solution by decreasing the rate of air injection therein to below substantially 100 cu. ft./min., thereafter and during substantially the remainder of the hydrolysis operation again maintaining said solution in substantially turbulent condition by increasing the rate of air injection to a fluid rate of flow from about 200 cu. ft./min. to about 400 cu. ft./min.

HOWARD J. WOOD.